(12) United States Patent
Wang

(10) Patent No.: US 9,684,107 B2
(45) Date of Patent: Jun. 20, 2017

(54) DETACHABLE LIGHTING SOURCE DEVICE HAVING A LIGHT GUIDING WIRE SET EQUIPPED WITH A DETACHABLE LIGHTING SOURCE

(71) Applicant: Po-Feng Wang, Taipei (TW)

(72) Inventor: Po-Feng Wang, Taipei (TW)

(*) Notice: Subject to any disclaimer, the term of this patent is extended or adjusted under 35 U.S.C. 154(b) by 48 days.

(21) Appl. No.: 14/798,548

(22) Filed: Jul. 14, 2015

(65) Prior Publication Data

US 2016/0018580 A1    Jan. 21, 2016

(30) Foreign Application Priority Data

Jul. 18, 2014 (TW) .............................. 103124684 A

(51) Int. Cl.
| | |
|---|---|
| *F21L 4/00* | (2006.01) |
| *F21V 8/00* | (2006.01) |
| *F21L 4/04* | (2006.01) |
| *A45C 15/06* | (2006.01) |
| *A45F 3/04* | (2006.01) |
| *A45F 3/00* | (2006.01) |

(52) U.S. Cl.
CPC ................ *G02B 6/001* (2013.01); *F21L 4/00* (2013.01); *F21L 4/045* (2013.01); *G02B 6/0006* (2013.01); *A45C 15/06* (2013.01); *A45F 3/04* (2013.01); *A45F 2003/001* (2013.01); *A45F 2003/003* (2013.01)

(58) Field of Classification Search
CPC ....... F21L 4/00; G02B 6/0006; F21Y 2101/00
USPC .......................... 362/570, 554, 577, 640, 647
See application file for complete search history.

(56) References Cited

U.S. PATENT DOCUMENTS 6,739,744 B2 * 5/2004 Williams ............... A61B 17/02
362/552

FOREIGN PATENT DOCUMENTS

| TW | M290689 U | 5/2006 |
|---|---|---|
| TW | M412663 U | 10/2011 |

* cited by examiner

*Primary Examiner* — Vip Patel
(74) *Attorney, Agent, or Firm* — Alan D. Kamrath; Kamrath IP Lawfirm, P.A.

(57) ABSTRACT

A device includes a main body and a light guiding wire set. The light guiding wire set has an illuminating apparatus, a detachable connecting device and at least one light guiding wire. When the illuminating apparatus connects with the detachable connecting device, the light provided by the illuminating apparatus is transmitted via the light guiding wire to achieve the effects of displaying, guiding, alerting, illuminating or decorating.

14 Claims, 4 Drawing Sheets

DETACHABLE LIGHTING SOURCE DEVICE HAVING A LIGHT GUIDING WIRE SET EQUIPPED WITH A DETACHABLE LIGHTING SOURCE

BACKGROUND OF THE INVENTION

1. Field of the Invention

The present invention relates to a device having a light guiding wire set equipped with a detachable lighting source and, more particularly, to a device equipped with a detachable illuminating apparatus.

2. Description of the Related Art

The lighting sources of backpacks for providing lighting features are powered by batteries or power modules. For example, the lighting devices of the "Illuminator for backpack" disclosed in TW M290689 and "Marquee bags" disclosed in TW M412663 are both powered by batteries.

The drawbacks of the above-mentioned art are that the power module has a certain weight, and that the power module has to be charged or that batteries have to be changed when the battery level is low. Furthermore, individual devices are equipped with specific power modules; i.e., the devices cannot be charged from mobile devices. As a result, it is difficult to manage the battery level, and the method for using the lighting device is complicated.

Therefore, since no device of the prior art is equipped with a detachable lighting source, it is necessary to provide a device having a light guiding wire set equipped with a detachable lighting source, and the illuminating apparatus of which is an external illuminating apparatus and can be connected with or detached from a connecting device to overcome the drawbacks of the prior art.

SUMMARY OF THE INVENTION

It is an object of the present invention to provide a device having a light guiding wire set equipped with a detachable lighting source. The light guiding wire set equipped with a detachable lighting source can be charged by an external power module to achieve power supply flexibility, to avoid the task of changing batteries, and to reduce the weight. Furthermore, when the illuminating apparatus is detached from the light guiding wire set, the illuminating apparatus can be independently illuminated.

It is an object to provide a device where the light of the illuminating apparatus is transmitted to the terminal luminous body via a light guiding wire that connects with the detachable connecting device for illuminating the terminal luminous body.

It is an object of the present invention to provide a light guiding wire that is illuminated while the light is being transmitted via the light guiding wire.

To achieve the abovementioned objects, the device having a light guiding wire set equipped with a detachable lighting source of the present invention provides an external illuminating apparatus. The device having a light guiding wire set equipped with a detachable lighting source has a main body and a light guiding wire set equipped with a detachable lighting source. The light guiding wire set equipped with a detachable lighting source connects with the main body and has an illuminating apparatus, a detachable connecting device, and at least one light guiding wire.

The illuminating apparatus is a lighting device, and the detachable connecting device is situated between the illuminating apparatus and the at least one light guiding wire. The detachable connecting device facilitates quick connection and detachment of the illuminating apparatus. Therefore, the illuminating apparatus can be quickly connected with the detachable connecting device and the light generated by the illuminating apparatus can be transmitted via the light guiding wire to achieve the effects of displaying, guiding, alerting, illuminating or decorating. The illuminating apparatus is detachably connected with the detachable connecting device and can be illuminated independently.

According to one embodiment of the present invention, the main body is a backpack, the illuminating apparatus is an electric torch, and the at least one light guiding wire is a light guide bar. Given the quick dismantling structure of the detachable connecting device, the light provided by the torch can be transmitted within the light guide bar.

According to another embodiment, the light guide bar is further connected with the terminal luminous body to allow the light of the illuminating apparatus to be transmitted to the terminal luminous body via the light guide bar such that the terminal luminous body can be illuminated for displaying, guiding, alerting, illuminating or decorating.

According to further another embodiment, the light guide bar has a feature of penetration of light. When the light is transmitted, the light guide bar is illuminated for displaying, guiding, alerting, illuminating or decorating.

DETAILED DESCRIPTION OF THE PREFERRED EMBODIMENT

Figure 1:
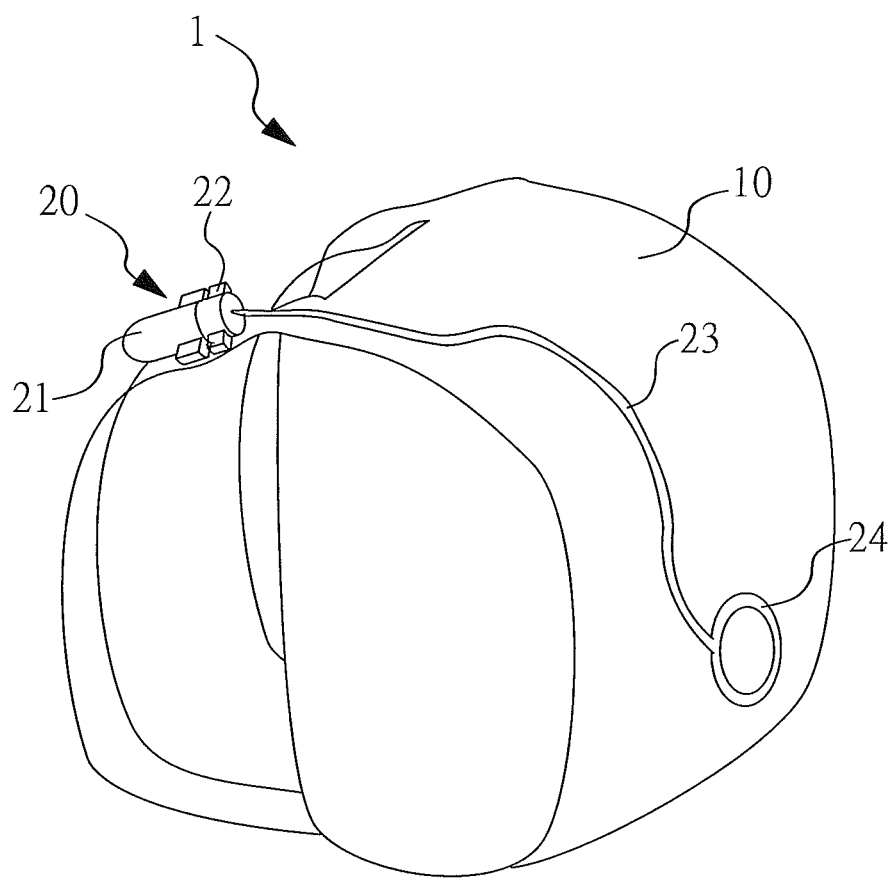
FIG. 1 is a schematic drawing related to one embodiment of the device having a light guiding wire set equipped with a detachable lighting source.

The technical content of the invention will become more apparent from the following detailed descriptions of several preferred embodiments. Please refer to FIG. 1, which depicts one embodiment of the device having a light guiding wire set equipped with a detachable lighting source.

According to one embodiment, the device having a light guiding wire set equipped with a detachable lighting source 1 comprises a main body 10 and a light guiding wire set 20 with a detachable lighting source. The light guiding wire set 20 with a detachable lighting source is connected with the main body 10. In the present embodiment, the main body 10 is a backpack, but the present invention is not limited to this embodiment. The light guiding wire set 20 with a detachable lighting source comprises an illuminating apparatus 21, a detachable connecting device 22, and at least one light guiding wire 23. The illuminating apparatus 21 can be connected with or detached from the detachable connecting device 22. The illuminating apparatus 21 is a luminous device, such as an electric torch, a mobile device with an illumination function, an LED lamp, etc. However, the present invention is not limited to these embodiments. The illuminating apparatus 21 is connected with the detachable connecting device 22. The detachable connecting device 22 is a quick dismantling structure such as a buckle, a swivel coupler or a strong magnet, but it is noted that the quick dismantling structure is not limited to those structures. The at least one light guiding wire 23 is connected with the detachable connecting device 22. The light guiding wire 23 is a soft light guiding material such as a light guide bar, but the light guiding wire 23 is not limited to this embodiment.

Given the structure described above, the illuminating apparatus 21 can be connected with the detachable connecting device 22 quickly, and the light of the illuminating apparatus 21 can be transmitted via the light guiding wire 23. When the illuminating apparatus 21 detaches from the detachable connecting device 22, the illuminating apparatus 21 can be illuminated independently. The light guiding wire set 20 with a detachable lighting source further comprises a terminal luminous body 24. The terminal luminous body 24 is a non-luminous body, such as light-transparent plastic or acrylic, but the present invention is not limited to those materials. The terminal luminous body 24 of the present embodiment has an effect of indication. However, the present invention is not limited to this effect.

Figure 2:
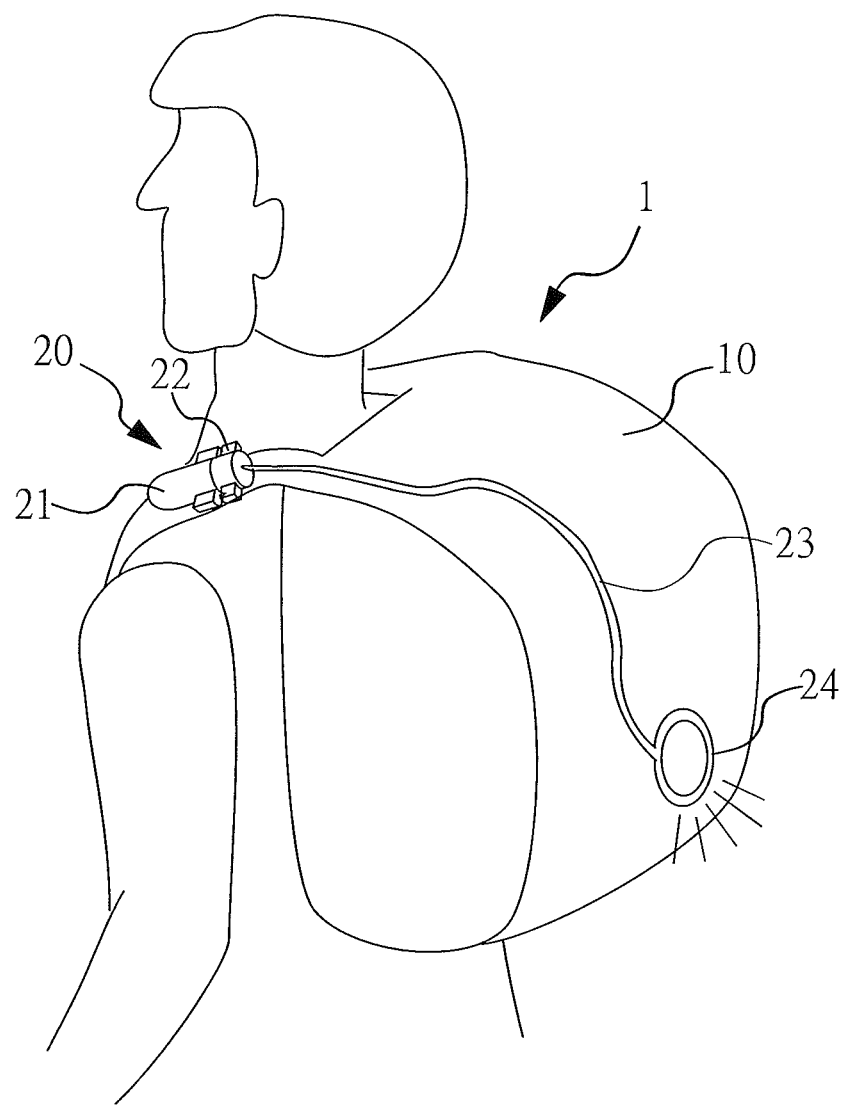
FIG. 2 is a schematic drawing showing the device having a light guiding wire set equipped with a detachable lighting source in one usage status.
Figure 3:
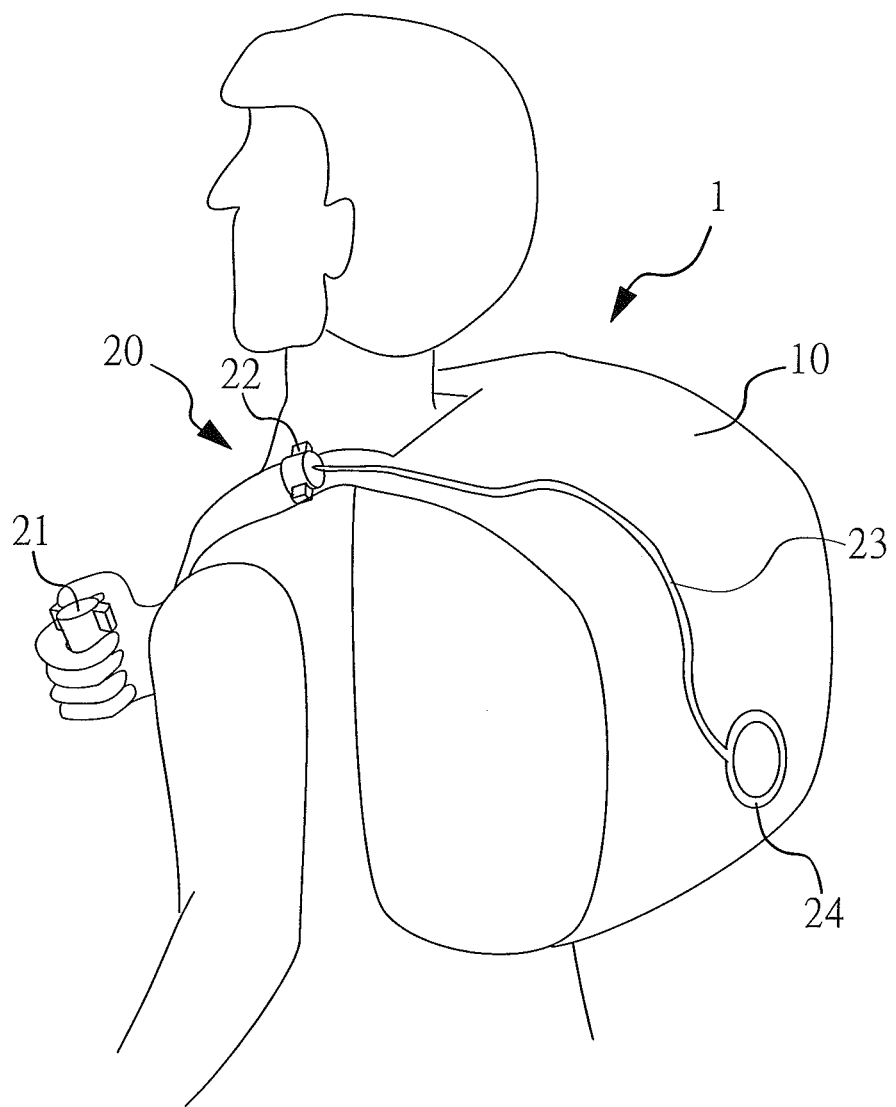
FIG. 3 is a schematic drawing showing the device having a light guiding wire set equipped with a detachable lighting source in another usage status.
Figure 4:
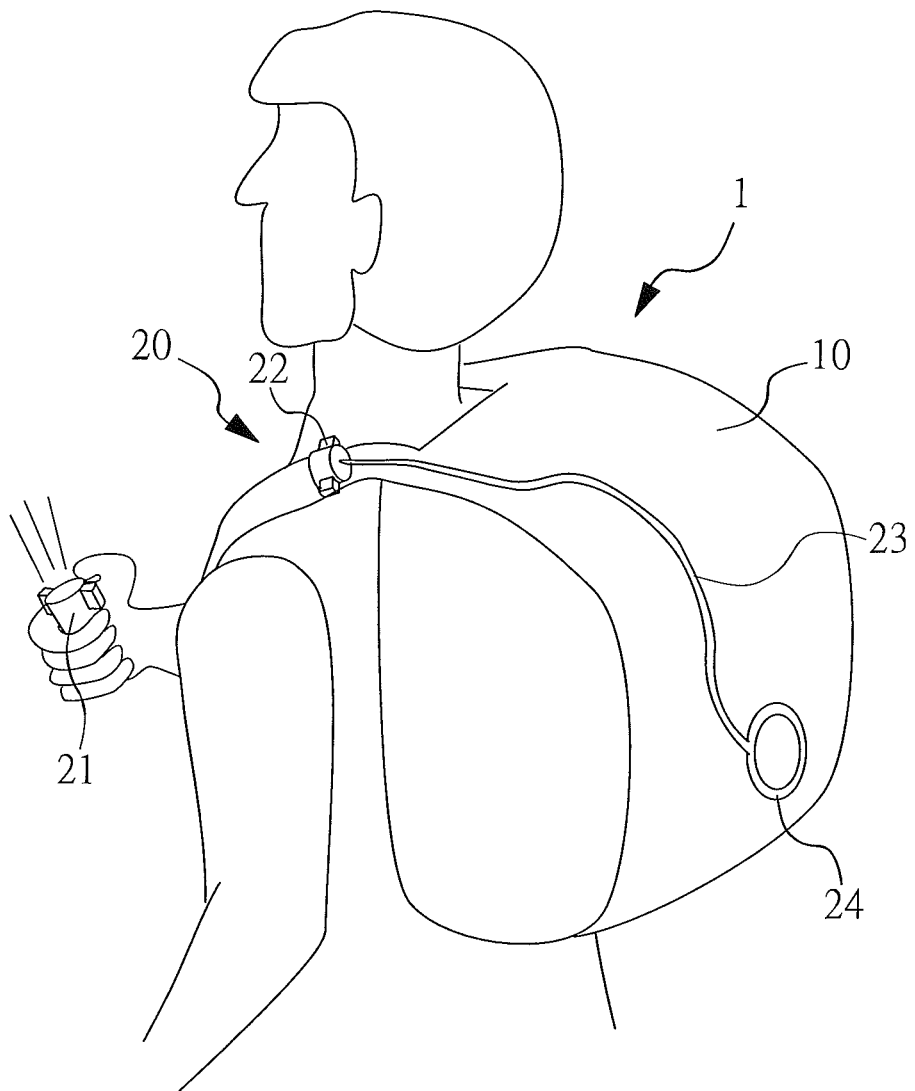
FIG. 4 is a schematic drawing showing the device having a light guiding wire set equipped with a detachable lighting source in further another usage status.

Next, please refer to FIG. 2, FIG. 3 and FIG. 4. FIG. 2 is a schematic drawing showing the device having a light guiding wire set equipped with a detachable lighting source in one usage status; FIG. 3 is a schematic drawing showing the device having a light guiding wire set equipped with a detachable lighting source in another usage status; and FIG. 4 is a schematic drawing showing the device having a light guiding wire set equipped with a detachable lighting source in further another usage status.

As shown in FIG. 2, the main body 10 is a backpack worn by a user. According to the present embodiment, the illuminating apparatus 21 is disposed on the detachable connecting device 22, and the illuminating apparatus 21 is situated at a side near the user to facilitate speedy connection or detachment of the illuminating apparatus 21. It is noted that the location of the illuminating apparatus 21 is not limited to the present embodiment. As shown in FIG. 2, the light guiding wire set 20 with a detachable lighting source further comprises a terminal luminous body 24, and the light of the illuminating apparatus 21 is transmitted to the terminal luminous body 24 via the at least one light guiding wire 23, such that the terminal luminous body 24 has an indicative effect. The at least one light guiding wire 23 also has a light-transparent feature and can be illuminated while the light of the illuminating apparatus 21 is being transmitted. The at least one light guiding wire 23 is a soft light guiding material and can be in a graphical format for indicating or decorating. Furthermore, the at least one light guiding wire 23 also has a color-filter feature for displaying a specific color while the light of the illuminating apparatus 21 is being transmitted, and a visual effect is generated. As shown in FIG. 3 and FIG. 4, when the illuminating apparatus 21 is detached, the illuminating apparatus 21 is an electric torch with an independent illumination function. However, the present invention is not limited to this embodiment.

As described above, the objectives, means, and effectiveness in the present invention are different from the characteristics in the prior art. It should be noted that the embodiments described above are for illustrating the principles and effects of the present invention, and not for limiting the scope of the present invention. Any person skilled in the art shall be able to make modifications and changes to the embodiments without departing from the technical principle and spirit of the present invention. The claims of the present invention within the scope of protection are described below.

What is claimed is:
1. A device comprising:
a main body; and
a set connecting with the main body, with the set having:
an illuminating apparatus for providing light;
a detachable connecting device detachably connecting with the illuminating apparatus; and
at least one light guiding wire connecting with the detachable connecting device, with the at least one light guiding wire transmitting the light provided by the illuminating apparatus;
wherein when the illuminating apparatus connects with the detachable connecting device, the light generated by the illuminating apparatus is transmitted via the at least one light guiding wire via the detachable connecting device, which is connected or detached quickly from the illuminating apparatus.

2. The device as claimed in claim 1, wherein the at least one light guiding wire is luminous; and wherein when the at least one light guiding wire receives the light provided by the illuminating apparatus, the at least one light guiding wire is illuminated.

3. The device as claimed in claim 1, wherein the at least one light guiding wire is a soft light guiding material.

4. The device as claimed in claim 3, wherein the at least one light guiding wire is luminous; and wherein when the at least one light guiding wire receives the light provided by the illuminating apparatus, the at least one light guiding wire is illuminated.

5. The device as claimed in claim 3, wherein the at least one light guiding wire has a color-filter feature.

6. The device as claimed in claim 1, wherein the illuminating apparatus of the set further comprises a terminal luminous body; wherein the terminal luminous body connects with the at least one light guiding wire, with the terminal luminous body being non-luminous, and wherein the terminal luminous body is illuminated by receiving light provided by the at least one light guiding wire.

7. The device as claimed in claim 6, wherein the at least one light guiding wire is luminous; and wherein when the at least one light guiding wire receives the light provided by the illuminating apparatus, the at least one light guiding wire is illuminated.

8. The device as claimed in claim 6, wherein the at least one light guiding wire is luminous; and wherein when the at least one light guiding wire receives the light provided by the illuminating apparatus, the at least one light guiding wire is illuminated.

9. The device as claimed in claim 6, wherein the at least one light guiding wire is a soft light guiding material.

10. The device as claimed in claim 9, wherein the at least one light guiding wire has a color-filter feature.

11. The device as claimed in claim 1, wherein the detachable connecting device is a quick dismantling structure for allowing the illuminating apparatus to be connected with or detached from the detachable connecting device quickly.

12. The device as claimed in claim 11, wherein the at least one light guiding wire is luminous; and wherein when the at least one light guiding wire receives the light provided by the illuminating apparatus, the at least one light guiding wire is illuminated.

13. The device as claimed in claim 11, wherein the at least one light guiding wire is a soft light guiding material.

14. The device as claimed in claim 13, wherein the at least one light guiding wire has a color-filter feature.

* * * * *